(12) United States Patent
Zhang et al.

(10) Patent No.: US 12,033,061 B2
(45) Date of Patent: Jul. 9, 2024

(54) CAPACITOR-BASED SYNAPSE NETWORK STRUCTURE WITH METAL SHIELDING BETWEEN OUTPUTS

(71) Applicant: International Business Machines Corporation, Armonk, NY (US)

(72) Inventors: Chen Zhang, Guilderland, NY (US); Jie Yang, Clifton Park, NY (US); Dexin Kong, Slingerlands, NY (US); Tenko Yamashita, Schenectady, NY (US)

(73) Assignee: International Business Machines Corporation, Armonk, NY (US)

( * ) Notice: Subject to any disclaimer, the term of this patent is extended or adjusted under 35 U.S.C. 154(b) by 877 days.

(21) Appl. No.: 17/120,937

(22) Filed: Dec. 14, 2020

(65) Prior Publication Data
US 2022/0188607 A1   Jun. 16, 2022

(51) Int. Cl.
  *G06N 3/063*  (2023.01)
  *G06N 3/04*   (2023.01)
  *G06N 3/08*   (2023.01)

(52) U.S. Cl.
  CPC ............... *G06N 3/063* (2013.01); *G06N 3/04* (2013.01); *G06N 3/08* (2013.01)

(58) Field of Classification Search
  CPC .................. G06N 3/063–065; H01G 4/00–40
  See application file for complete search history.

(56) References Cited

U.S. PATENT DOCUMENTS

| | | |
|---|---|---|
| 5,187,680 A | 2/1993 | Engeler |
| 5,343,555 A | 8/1994 | Yayla et al. |
| 5,386,149 A | 1/1995 | Arima |
| 7,180,125 B2 | 2/2007 | Wang |
| 8,416,609 B2 | 4/2013 | Meade |
| 10,504,575 B2 | 12/2019 | Demasius et al. |
| 10,505,108 B2 | 12/2019 | Marukame et al. |
| 2008/0275832 A1 | 11/2008 | McDaid et al. |
| 2018/0211162 A1 | 7/2018 | Burr et al. |
| 2019/0213471 A1 | 7/2019 | Jeon et al. |
| 2019/0237120 A1 | 8/2019 | Demasius et al. |
| 2019/0303744 A1 | 10/2019 | Yang et al. |
| 2020/0013791 A1 | 1/2020 | Or-Bach et al. |

FOREIGN PATENT DOCUMENTS

| | | |
|---|---|---|
| EP | 3523805 A1 | 8/2019 |
| JP | 2018049887 A | 3/2018 |

OTHER PUBLICATIONS

International Search Report and Written Opinion of PCT/CN2021/128126, Jan. 27, 2022, 9 pages.

P. Mell et al., "The NIST Definition of Cloud Computing," Recommendations of the National Institute of Standards and Technology, Special Publication 800-145, Sep. 2011, 7 pages.

*Primary Examiner* — Amar Movva
(74) *Attorney, Agent, or Firm* — Samuel Waldbaum; Ryan, Mason & Lewis LLP

(57) ABSTRACT

A neural network device comprises a first plurality of synapse network capacitors, wherein the synapse network capacitors of the first plurality of synapse network capacitors share a first output terminal. The neural network device further comprises a second plurality of synapse network capacitors, wherein the synapse network capacitors of the second plurality of synapse network capacitors share a second output terminal. Still further, the neural network device comprises a metal shielding disposed between the first output terminal and the second output terminal. The neural network device may be used as part of an artificial intelligence system.

13 Claims, 8 Drawing Sheets

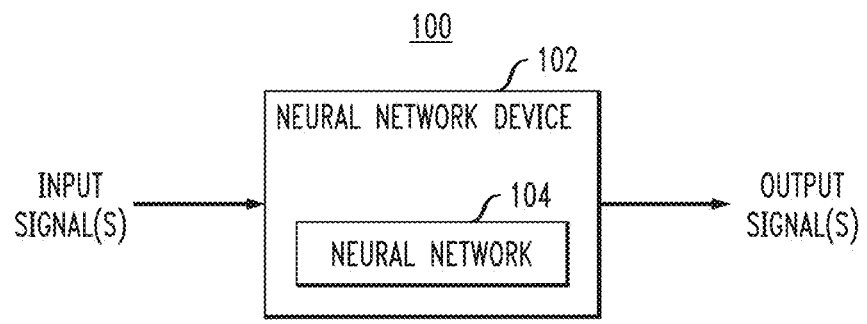
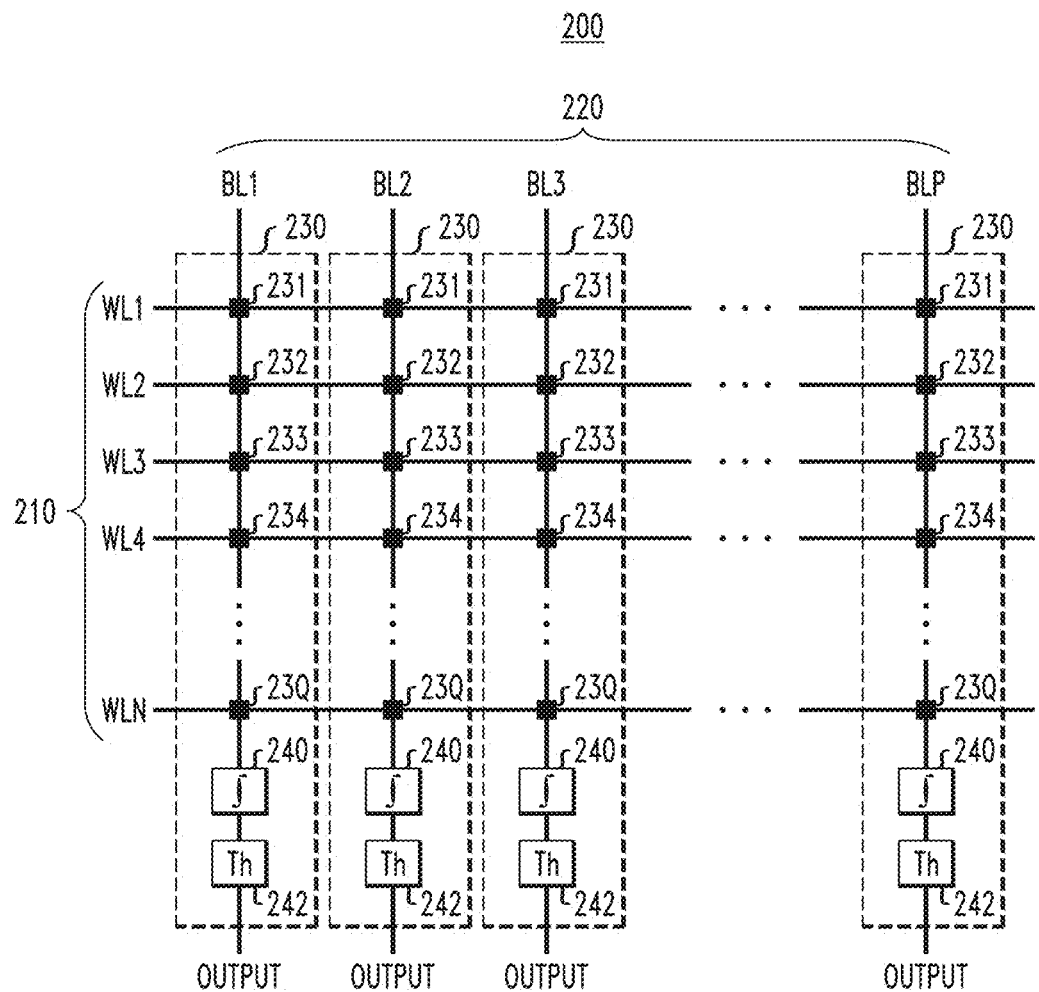

300

400

500

700

800

810

CAPACITOR-BASED SYNAPSE NETWORK STRUCTURE WITH METAL SHIELDING BETWEEN OUTPUTS

BACKGROUND

A deep neural network (DNN) is an example of an artificial neural network (ANN) which is a structure composed of multiple layers (e.g., an input layer, a plurality of hidden or intermediate layers, and an output layer) wherein layers comprise network nodes (representing "neurons") operatively coupled by connectors weighted based on relative importance of the connection (representing "synapses") in different configurations. DNNs have many hidden or intermediate layers (e.g., on the order of tens, hundreds, or even thousands, thus the term "deep") and are designed to mimic the decision functioning of the biological human (or animal) brain.

As such, DNNs have been implemented in many technology areas including, but not limited to, artificial intelligence systems including machine or deep learning algorithms implemented in one or more neuromorphic or neural network devices. Examples of applications for neural network-based artificial intelligence systems include, but are not limited to, image or object recognition. In image or object recognition, a type of DNN called a convolutional neural network (CNN) is used (e.g., a CNN performs mathematical convolution operations to generate one or more image classifications).

The underlying computing hardware used to implement a DNN (a CNN or any other form of an ANN) may include, but is not limited to, a central processing unit (CPU), a graphics processing unit (GPU), or an application-specific integrated circuit (ASIC) which is based on standard complementary metal oxide semiconductor (CMOS) logic. Resistor-based (e.g., memristors) networks have commonly been used to implement synapses of a DNN.

SUMMARY

Embodiments of the invention provide a capacitor-based synapse network structure with metal shielding between outputs.

In one illustrative embodiment, a neural network device comprises a first plurality of synapse network capacitors, wherein the synapse network capacitors of the first plurality of synapse network capacitors share a first output terminal. The neural network device further comprises a second plurality of synapse network capacitors, wherein the synapse network capacitors of the second plurality of synapse network capacitors share a second output terminal. Still further, the neural network device comprises a metal shielding disposed between the first output terminal and the second output terminal.

Further illustrative embodiments are respectively provided in forms of a method for fabricating a neural network device with a capacitor-based synapse network having metal-shielded outputs and an artificial intelligence system with a neural network device with a capacitor-based synapse network having metal-shielded outputs.

These and other features and advantages of embodiments described herein will become more apparent from the accompanying drawings and the following detailed description.

BRIEF DESCRIPTION OF THE DRAWINGS

FIG. 1 depicts a block diagram of a neural network computing environment with which one or more illustrative embodiments can be implemented.

FIG. 2 depicts a schematic circuit diagram of a neural network device with which one or more illustrative embodiments can be implemented.

DETAILED DESCRIPTION

Figure 3:
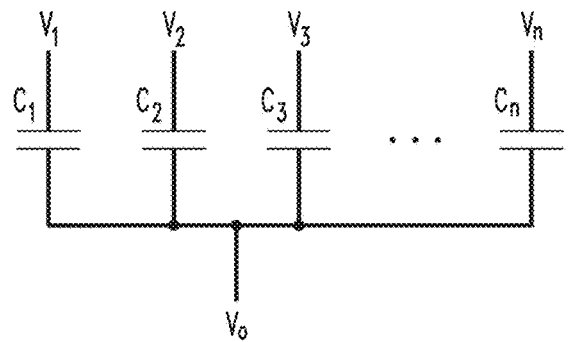
FIG. 3 depicts a schematic circuit diagram of a single output capacitor-based structure used to implement a positive synapse network.

As mentioned above in the background section, the underlying computing hardware used to implement a DNN (CNN or any ANN) may include, but is not limited to, a CPU, a GPU, an ASIC, etc. For example, resistive random-access memory (ReRAM) or phase change memory (PCM) devices (referred to as cross-point structures) have been used to perform computations associated with DNNs, where resistance/conductance is used to represent a synapse. ReRAM is a type of non-volatile RAM that uses a change in the electrical resistance across a dielectric solid-state material, referred to as a memristor, to store data. PCM is a type of non-volatile RAM that uses the electrical resistance contrast between a high-conductive crystalline phase and a low-conductive amorphous phase of a phase change material to store data.

In addition to the above-mentioned resistance-based approaches for implementing synapses in a DNN, it is realized that capacitors can be used to represent synapses. A capacitor-based synapse network provides similar neuron-connectivity functionalities as a resistor-based synapse network but does not consume static power. However, one drawback of a neural network with capacitor-based synapses is that the output nodes may interact with each other through unwanted coupling capacitance.

Before further explaining drawbacks associated with existing capacitor-based synapse networks and how illustrative embodiments overcome these and other drawbacks, an example of an artificial intelligence system with a set of neural network devices with which illustrative embodiments can be implemented will be described.

More particularly, FIG. 1 depicts a neural network computing environment 100 comprising a neural network device 102 with which one or more illustrative embodiments can be implemented. As shown, neural network device 102 comprises a neural network 104, and receives one or more input signals and generates one or more output signals.

Byway of example only, in an image or object recognition application, the input signal(s) can comprise an image and the neural network device implements a CNN that generates one or more image classifications or the like as the output signal(s). The CNN uses convolutional layers of neurons that are connected via synapses, and features are extracted from the image and processed through the network. The final layer of the CNN provides the computed classifications associated with the input image, resulting in a trained neural network with weights and feature detectors. The trained neural network is then used for real-time image recognition based on a target image.

Thus, in FIG. 1, neural network device 102 is configured to train neural network 104, and then use the trained neural network 104 for image or object recognition. By way of one simple example only, a CNN can be trained using an image of an automobile and then subsequent images can be applied to the trained CNN to determine if any of the subsequent images include an automobile. Image recognition using a neural network device such as that illustrated in FIG. 1 can be used in a wide variety of applications including, but not limited to, engineering, security, and medicine, to name a few. Multiple neural network devices 102 can be employed together to form an artificial intelligence system. Also, in some embodiments, a single neural network device 102 can comprise multiple neural networks 104. Further, in some embodiments with multiple neural network devices 102, one or more of the neural network devices 102 can have a single neural network 104, while one or more other neural network devices 102 can have multiple neural networks 104.

FIG. 2 depicts a schematic circuit diagram of a neural network device 200 with which one or more illustrative embodiments can be implemented. It is to be appreciated that the neural network device 200 is an example implementation of neural network device 102 with neural network 104 in FIG. 1. It is to be appreciated that portions of the neural network device 102 and neural network 104 relevant to the detailed description of illustrative embodiments are depicted in FIG. 2. Thus, a neural network device and neural network may have one or more other components and elements not expressly shown in FIG. 2.

As shown, neural network device 200 comprises a plurality of word lines 210 (WL1, WL2, WL3, WL4, . . . , WLN) and a plurality of bit lines 220 (BL1, BL2, BL3, . . . , BLP). The plurality of word lines 210 and the plurality of bit lines 220 do not directly connect but rather have synapse elements connected therebetween at each cross-point (i.e., physical location where a word line and bit line physically come close to one another but do not physically connect). The synapse elements are represented as synapse elements 231, 232, 233, 234, . . . , 23Q in FIG. 2. Each bit line 220 also has an integrator 240 and a threshold detector 242 connected as shown. A plurality of synapse elements 231, 232, 233, 234, . . . , 23Q, integrator 240, and threshold detector 242 collectively comprise a neural network portion 230 (e.g., part of neural network 104 of neural network device 102). Each of the neural network portions 230 is configured to change its electrostatic capacitance in response to one or more input signals. Furthermore, it is to be understood that each individual synapse element 231, 232, 233, 234, . . . , 23Q is addressable via its corresponding word line, while a plurality of synapse devices forming each neural network portion 230 is addressable via its corresponding bit line. In illustrative embodiments, neural network portions 230 are implemented using semiconductor fabrication techniques to produce one or more semiconductor devices. Note that while memory device-type terms such as "word lines" and "bit lines" are illustratively used herein, it is to be appreciated that these control signal lines are more generally used to access each individual synapse element and may not necessarily be referred to as word lines and bit lines in every neuromorphic embodiment.

FIG. 3 depicts a schematic circuit diagram of a single output capacitor-based structure 300 used to implement a positive synapse network. More particularly, single output capacitor-based structure 300 is an example of the plurality of synapse elements 231, 232, 233, 234, . . . , 23Q in a neural network portion 230 of FIG. 2. As shown, single output capacitor-based structure 300 comprises a plurality of capacitors $C_1, C_2, C_3, \ldots, C_n$ with each capacitor having a first terminal coupled to an input voltage source $V_1, V_2, V_3, \ldots, V_n$ respectively for $C_1, C_2, C_3, \ldots, C_n$, and a second terminal coupled to a single common output $V_o$. Note that inputs $V_1, V_2, V_3, \ldots, V_n$ correspond to the word (access) lines WL1, WL2, WL3, . . . , WLN in FIG. 2, and output $V_o$ corresponds to one of the bit (access) lines BL1, BL2, BL3, . . . , or BLP in FIG. 2. Each capacitor $C_1, C_2, C_3, \ldots, C_n$ is configured such that its electrostatic capacitance is adjustable to one of multiple levels based on its respective input voltage $V_1, V_2, V_3, \ldots, V_n$. It is to be appreciated that, for the sake of simplicity, integrator 240 and threshold detector 242 are not shown in FIG. 3; however, it is to be understood that integrator 240 receives a signal indicative of the electrostatic capacitance level of each capacitor $C_1, C_2, C_3, \ldots, C_n$ and generates an integrated signal therefrom. The integrated signal is then compared in the threshold detector 242 to a given threshold value. More particularly, total electrostatic capacitance $C_{tot}$ is defined as:

$$C_{tot} = \Sigma_{i=1}^{i=n} C_i \quad (1)$$

and, as such, voltage output $V_o$ is defined as:

$$V_o = \frac{\sum_{i=1}^{i=n} V_i C_i}{C_{tot}} \quad (2)$$

It is evident that $V_o$ is a linear combination of all the input voltages. The synapse value for each input voltage $V_i$ is $C_i/C_{tot}$. $V_o$ is compared to the given threshold value and, based on the result of the comparison, a decision is generated by the neural network portion 230.

Figure 4:
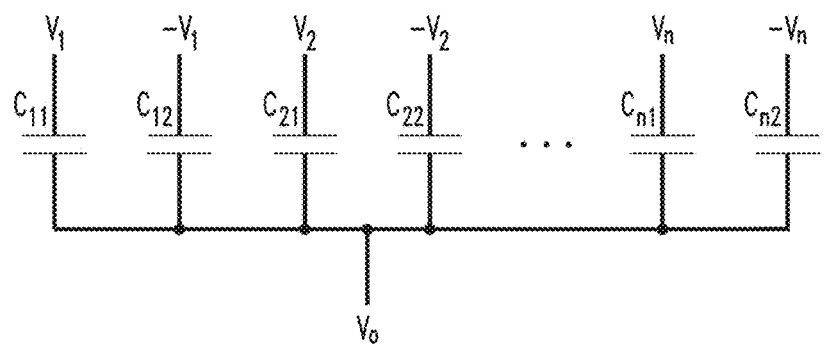
FIG. 4 depicts a schematic circuit diagram of a single output capacitor-based structure used to implement a negative synapse network.

FIG. 4 depicts a schematic circuit diagram of a single output capacitor-based structure 400 used to implement a negative synapse network. More particularly, single output capacitor-based structure 400 is another example of the plurality of synapse elements 231, 232, 233, 234, . . . , 23Q in a neural network portion 230 of FIG. 2. As shown, single output capacitor-based structure 400 comprises a plurality of capacitors $C_{11}, C_{12}, C_{21}, C_{22}, \ldots, C_{n1}, C_{n2}$ with each capacitor having a first terminal coupled to an input voltage source $V_1, -V_1, V_2, -V_2, \ldots, V_n, -V_n$ respectively for $C_{11}, C_{12}, C_{21}, C_{22}, \ldots, C_{n1}, C_{n2}$, and a second terminal coupled to a single common output $V_o$. Each capacitor $C_{11}, C_{12}, C_{21},$ $C_{22}, \ldots, C_{n1}, C_{n2}$ is configured such that its electrostatic capacitance is adjustable to one of multiple levels based on its respective input voltage $V_1, -V_1, V_2, -V_2, \ldots, V_n, -V_n$. It is to be appreciated that, for the sake of drawing simplicity, integrator 240 and threshold detector 242 are not shown in FIG. 4; however, it is to be understood that integrator 240 receives a signal indicative of the electrostatic capacitance level of each capacitor $C_{11}, C_{12}, C_{21}, C_{22}, \ldots, C_{n1}, C_{n2}$ and generates an integrated signal therefore. The integrated signal is compared in the threshold detector 242 to a given threshold value. More particularly, defined similarly to equations (1) and (2) above:

$$C_{tot} = \Sigma_{i=1}^{i=n}(C_{i1}+C_{i2}) \quad (3)$$

and, as such:

$$V_o = \frac{\sum_{i=1}^{i=n} Vi(C_{i1} - C_{i2})}{C_{tot}} \quad (4)$$

If $C_{i1}<C_{i2}$, the synapse is considered negative. Again, $V_o$ is compared to the given threshold value and, based on the result of the comparison, a decision is generated by the neural network portion 230.

Figure 5:
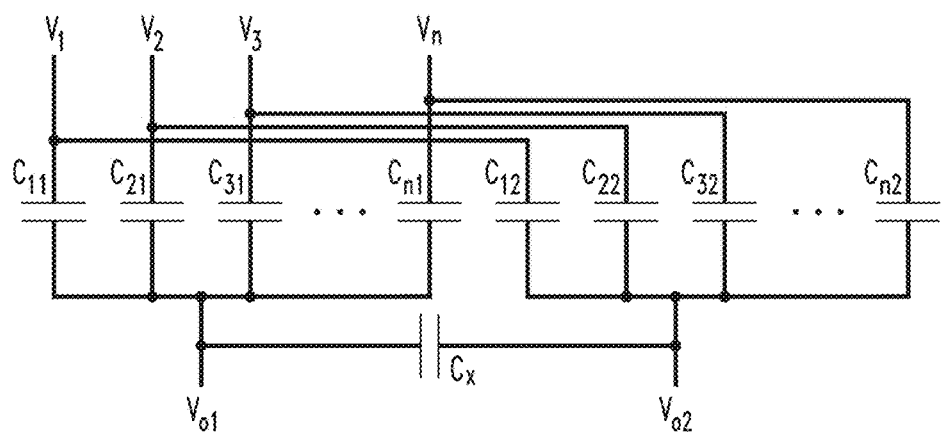
FIG. 5 depicts a schematic circuit diagram of a coupling capacitance issue in a multiple output capacitor-based structure used to implement a synapse network.

FIG. 5 depicts a schematic circuit diagram of a coupling capacitance issue in a multiple output capacitor-based structure 500 used to implement a synapse network. As shown, multiple output capacitor-based structure 500 comprises a first plurality of capacitors $C_{11}, C_{21}, C_{31}, \ldots, C_{n1}$ and a second plurality of capacitors $C_{12}, C_{22}, C_{32}, \ldots, C_{n2}$. Each of the capacitors in the first plurality of capacitors $C_{11}, C_{21}, C_{31}, \ldots, C_{n1}$ has a first terminal coupled to an input voltage source $V_1, V_2, V_3, \ldots, V_n$ respectively and a second terminal coupled to a single common output $V_{o1}$. Each of the capacitors of the second plurality of capacitors $C_{12}, C_{22}, C_{32}, \ldots, C_{n2}$ has a first terminal coupled to the input voltage source $V_1, V_2, V_3, \ldots, V_n$ respectively and a second terminal coupled to a single common output $V_{o2}$. While each of the two pluralities of capacitors in FIG. 5 are identical to the plurality of capacitors shown in FIG. 3, each one could alternatively be configured identical to the plurality of capacitors shown in FIG. 4, or some other configuration. The point is that, due to parasitic capacitive coupling effects caused by electric fields, one signal in proximity to another signal causes interference in the form of noise in the other signal. Thus, as illustrated in FIG. 5, the output $V_{o1}$ can interfere with the output $V_{o2}$, and visa-versa. The parasitic capacitive coupling effect between the two outputs is represented as coupling capacitance $C_x$. Due to the existence of $C_x$, $V_{o1}$ and $V_{o2}$ affect each other and thus cannot be defined by the straightforward formulas of equations (2) or (4) above. This unwanted coupling capacitance between outputs $V_{o1}$ and $V_{o2}$ poses a problem for neural networks in that it can cause errors in the integration (integrator 240) and threshold detection (threshold detector 242) stages and thus lead to incorrect decisions in the overall artificial intelligence algorithm.

Illustrative embodiments overcome the above and other drawbacks associated with capacitor-based synapse networks by providing a structure with metal shielding between outputs.

Figure 6:
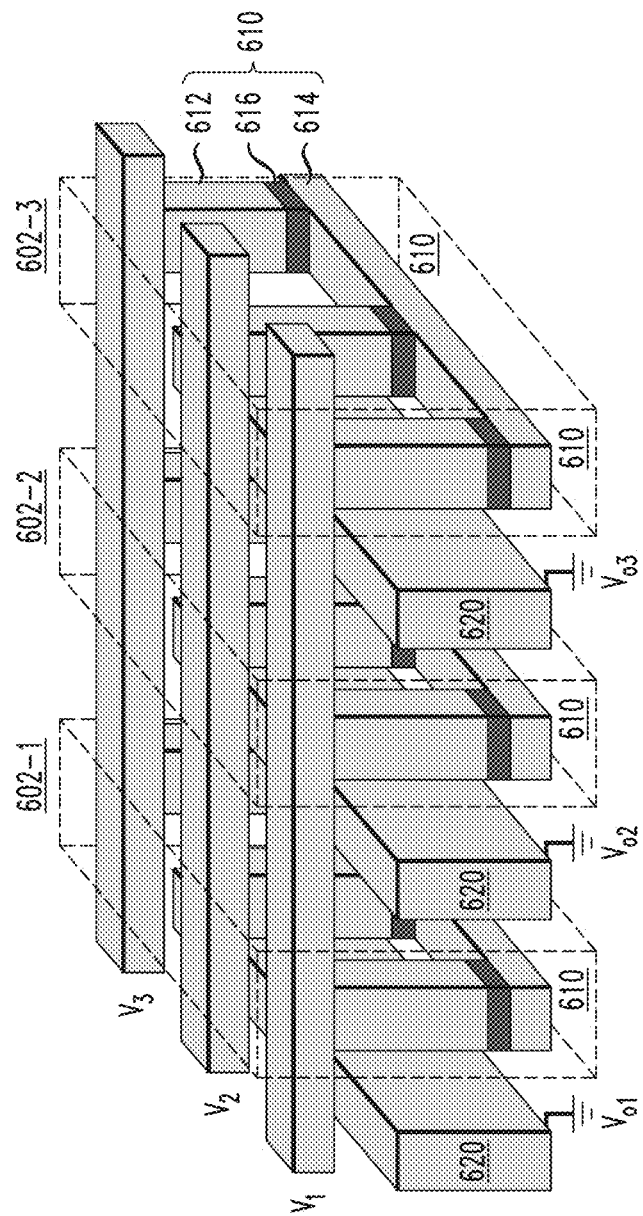
FIG. 6 depicts an isometric structural diagram of a multiple output capacitor-based structure with metal shielding between outputs and used to implement a synapse network according to an illustrative embodiment.

FIG. 6 depicts an isometric structural diagram of a multiple output capacitor-based structure 600 with metal shielding between outputs and used to implement a synapse network according to an illustrative embodiment. More particularly, as shown, multiple output capacitor-based structure 600 comprises three pluralities of capacitors 602-1, 602-2 and 602-3, wherein each plurality itself comprises three capacitors, each capacitor referenced as 610. Each capacitor 610 (represented by the capacitor in the upper righthand corner of the figure for simplicity) comprises a first terminal 612 and a second terminal 614 with a dielectric material 616 disposed between the two terminals 612 and 614. The first terminal 612 of each capacitor 610 is operatively coupled to an input voltage, respectively, $V_1$, $V_2$ or $V_3$. The second terminal 614 of each capacitor 610 is operatively coupled to an output voltage, in this case, $V_{o3}$ (i.e., as shown, capacitors in the same plurality of capacitors are operatively coupled to the same output, $V_{o1}$, $V_{o2}$ or $V_{o3}$). The dielectric material 616 is a high-k material such as, but not limited to, hafnium dioxide ($HfO_2$), zirconium dioxide ($ZrO_2$) or the like, as well as combinations thereof.

Furthermore, each plurality of capacitors 602 has a metal shielding 620 associated therewith. In illustrative embodiments, the metal shielding 620 is comprised of a material such as, but not limited to, titanium nitride (TiN), tungsten (W), copper (Cu) or the like, as well as combinations thereof. In illustrative embodiments, dimensions of the metal shielding 620 can range from a few nanometers to a few hundreds of nanometers, depending on the dimensional scaling of the capacitors. As shown, metal shielding 620 is disposed between each of the plurality of capacitors 620 as shown. Metal shielding 620 disposed in this manner prevents interference on a given output from an adjacent output, e.g., $V_{o1}$ and $V_{o2}$ are capacitively decoupled from one another, while $V_{o2}$ and $V_{o3}$ are capacitively decoupled from one another. Metal shielding 620 is grounded in the illustrative embodiment shown in FIG. 6. However, metal shielding 620 adds to $C_{tot}$ as will be further explained below in the context of FIG. 7.

Figure 7:
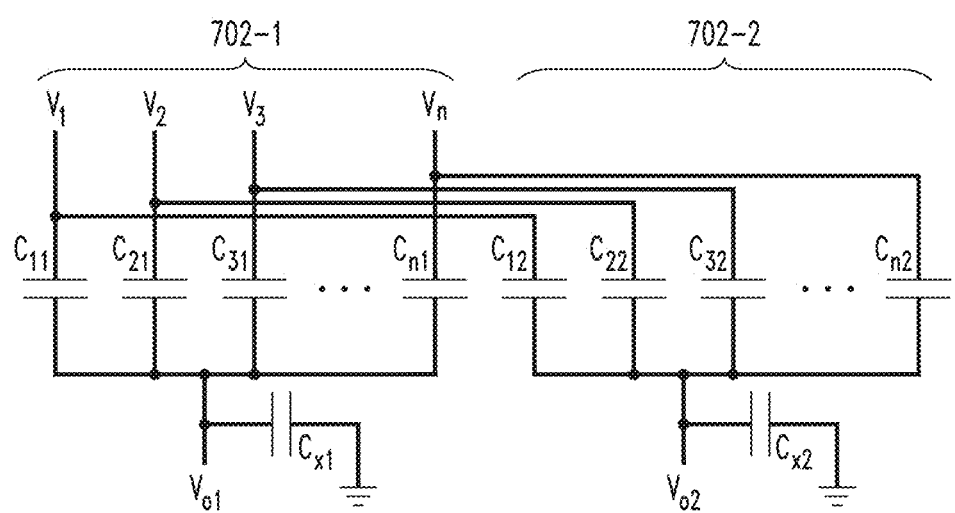
FIG. 7 depicts a schematic circuit diagram of a multiple output capacitor-based structure with metal shielding between outputs and used to implement a synapse network according to an illustrative embodiment.

FIG. 7 depicts a schematic circuit diagram of a multiple output capacitor-based structure 700 with metal shielding between outputs and used to implement a synapse network according to an illustrative embodiment. It is to be understood that multiple output capacitor-based structure 700 is similar to multiple output capacitor-based structure 500 of FIG. 5 but wherein it is assumed that metal shielding 620 is disposed as depicted in FIG. 6 between the pluralities of capacitors 702-1 and 702-2 such that output $V_{o1}$ has a separate shielding capacitance $C_{x1}$ while output $V_{o2}$ has a separate shielding capacitance $C_{x2}$.

Accordingly, by way of example with respect to the plurality of capacitors 702-1, $C_{tot}$ is now defined as:

$$C_{tot1} = C_{x1} + \Sigma_{i=1}^{i=n} C_{i1} \quad (5)$$

and, as such:

$$V_{o1} = \frac{\sum_{i=1}^{i=n} ViCi1}{C_{tot1}} \quad (6)$$

$C_{tot}$ and $V_{o2}$ for the plurality of capacitors 702-2 change in the same way as shown in equations (5) and (6), respectively, but with the addition of $C_{x2}$ rather than $C_{x1}$.

Figure 8A:
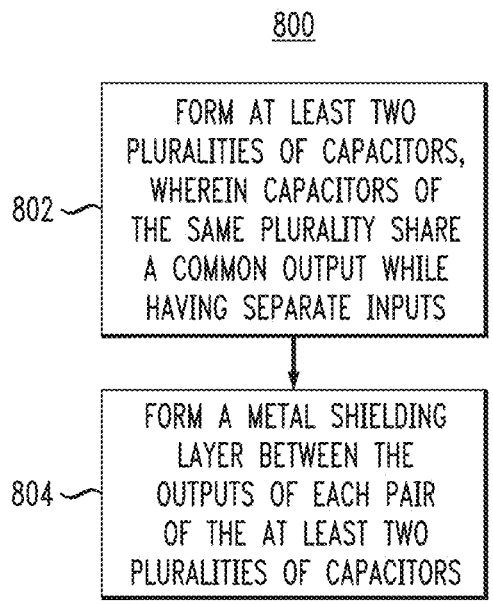
FIG. 8A depicts a flow diagram of a methodology for fabricating a multiple output capacitor-based structure with metal shielding between outputs used to implement a synapse network according to an illustrative embodiment.

FIG. 8A depicts a flow diagram of methodology 800 for fabricating a multiple output capacitor-based structure with metal shielding between outputs used to implement a synapse network according to an illustrative embodiment. It is to be appreciated that methodology 800 can be performed, for example, as part of a semiconductor fabrication process that fabricates a neural network device such as 102 in FIG. 1. However, in alternative embodiments, methodology 800 can be performed by other fabrication techniques configured to perform the steps of the methodology.

Step 802 forms at least two pluralities of capacitors, wherein capacitors of the same plurality share a common output while having separate inputs (e.g., see FIG. 6 or 7). It is to be appreciated that semiconductor fabrication of the at least two pluralities of capacitors can performed in a variety of manners. By way of example only, capacitor fabrication techniques described in U.S. Pat. No. 10,505,108 entitled "Memcapacitor, Neuro Device, and Neural Network Device" and issued on Dec. 10, 2019, can be adapted to fabricate the at least two pluralities of capacitors in step 802.

Step 804 forms a metal shielding layer between the outputs of each pair of the at least two pluralities of capacitors as described herein.

Figure 8B:
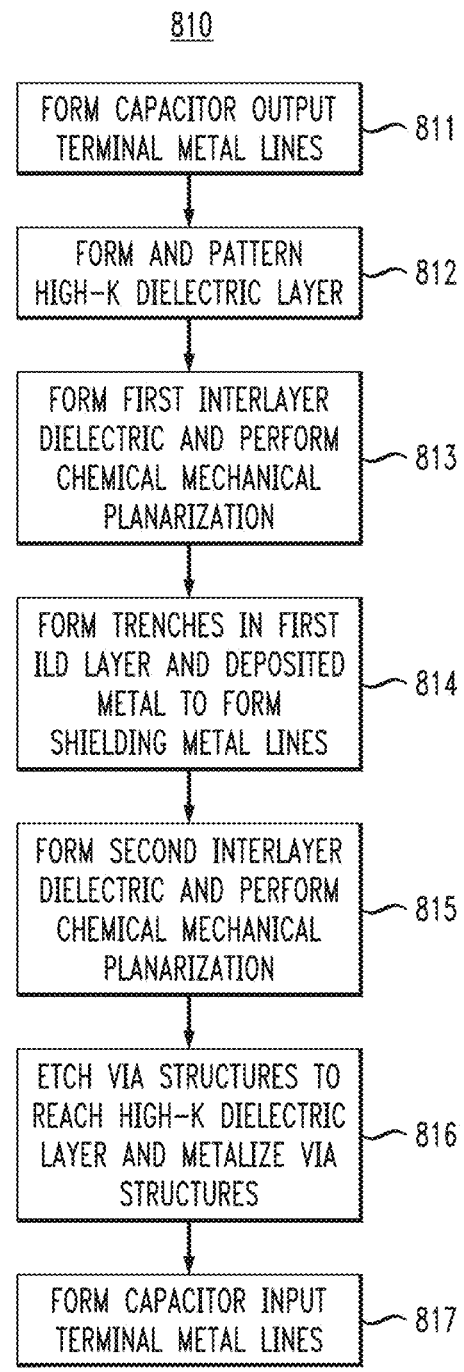
FIG. 8B depicts another flow diagram of a methodology for fabricating a multiple output capacitor-based structure with metal shielding between outputs used to implement a synapse network according to an illustrative embodiment.

In at least one semiconductor fabrication-based embodiment, with reference to multiple output capacitor-based structure 600 (of FIG. 6), FIG. 8B illustrates a methodology 810 performed to form the metal shielding layer between the outputs of each pair of pluralities of capacitors 602.

First, in step 811, capacitor output terminal metal lines ($V_{o1}$, $V_{o2}$ or $V_{o3}$) are formed. Next, in step 812, the high-k dielectric material 616 is formed and patterned. In step 813, a first interlayer dielectric (ILD) layer is formed and a chemical mechanical planarization (CMP) operation is applied. Next, in step 814, trenches are formed in the first ILD layer and metal is deposited to form shielding metal lines. A second ILD layer is formed and CMP is applied in step 815. In step 816, via structures are etched to reach the high-k dielectric material 616 and the via structures are then metallized. In step 817, the capacitor input metal lines ($V_1$, $V_2$ or $V_3$) are then formed. It is to be appreciated that the fabrication process in FIG. 8B is just one example and that alternative embodiments contemplate additional or alternative fabrication steps and techniques, and in different orders of steps, to form a multiple output capacitor-based structure with metal shielding between outputs.

Figure 8C:
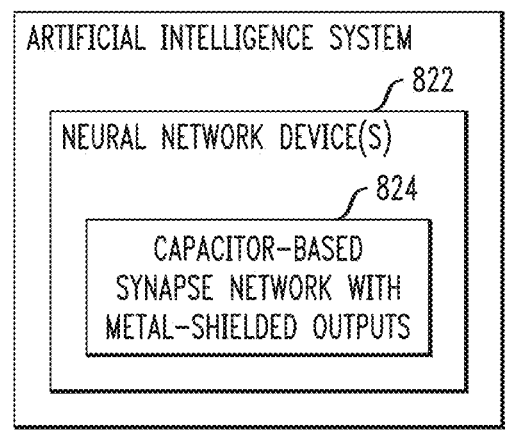
FIG. 8C depicts a block diagram of an artificial intelligence system with one or more neural network devices having a capacitor-based synapse network with metal-shielded outputs according to an illustrative embodiment.

FIG. 8C depicts a block diagram of an artificial intelligence system 820 with one or more neural network devices having a capacitor-based synapse network with metal-shielded outputs according to an illustrative embodiment. In one or more illustrative embodiments, the capacitor-based synapse network with metal-shielded outputs can be fabricated in accordance with methodology 800 in FIG. 8A and/or methodology 810 in FIG. 8B.

As shown, artificial intelligence system 820 comprises one or more neural network devices 822 with a capacitor-based synapse network with metal-shielded outputs 824. In one exemplary embodiment, the one or more neural network devices 822 with a capacitor-based synapse network with metal-shielded outputs 824 of artificial intelligence system 820 are implemented by one or more application-specific integrated circuits (ASICs). ASICs are integrated circuit (IC) chips or devices customized for a particular purpose that comprise logic (e.g., circuitry, processors, memory, etc.) that are programmed with executable program code (e.g., instruction code, computer program code, etc.) or otherwise configured for the particular purpose. In this exemplary case, the particular purpose is the implementation and execution of an artificial intelligence system (e.g., machine learning algorithm) and, more specifically, the implementation of a synapse network used as part of a neural network. An ASIC is also considered a system-on-chip (SoC).

It is to be further appreciated that artificial intelligence system 820 and the parts thereof can be realized in alternative circuitry/processor-based technology such as technology including one or more multi-core central processing units (CPUs), one or more graphics processing units (GPUs), and one or more field programmable gate arrays (FPGAs). In some embodiments, artificial intelligence system 820 can be implemented as a combination of two or more circuitry/processor-based technologies (e.g., ASIC, CPU, GPU, FPGA, etc.).

The techniques depicted in FIGS. 1-8C can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIGS. 1-8C can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 9:
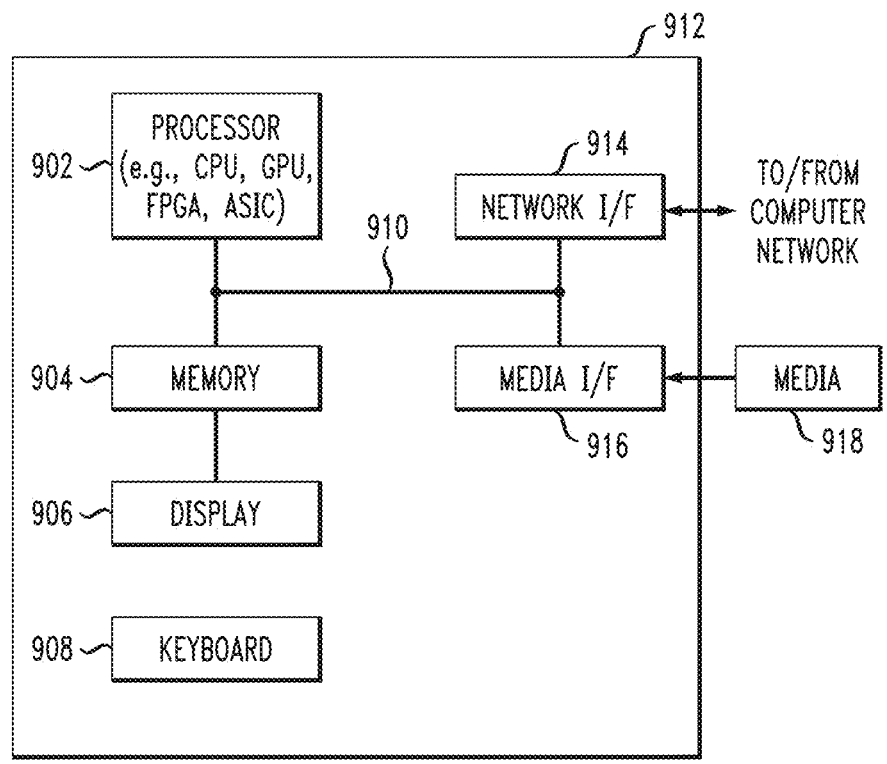
FIG. 9 depicts a diagram of an exemplary processor system according to an illustrative embodiment.

Additionally, an embodiment of the present invention can make use of software running on a computer or workstation. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a multi-core CPU, GPU, FPGA and/or other forms of processing circuitry such as one or more ASICs. Further, the term "processor" may refer to more than one individual processor. The term "memory" is intended to include memory associated with a processor (e.g., CPU, GPU, FPGA, ASIC, etc.) such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of embodiments of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 902. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICs), functional circuitry, an appropriately programmed digital computer with associated memory, and the like. Given the teachings of the invention provided herein, one of ordinary skill in the related art will be able to contemplate other implementations of the components of the invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
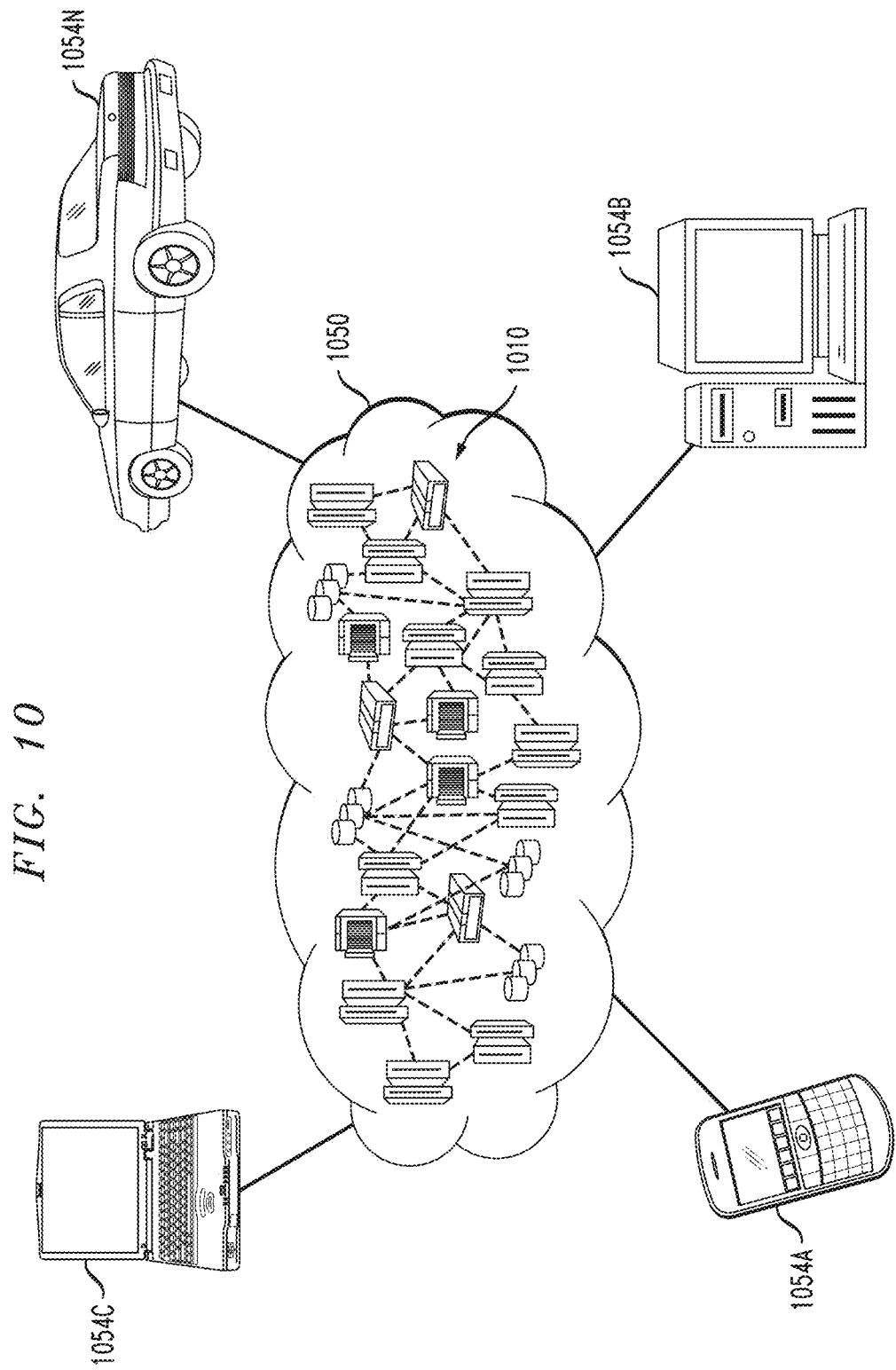
FIG. 10 depicts a diagram of a cloud computing environment according to an illustrative embodiment.

Referring now to FIG. 10, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
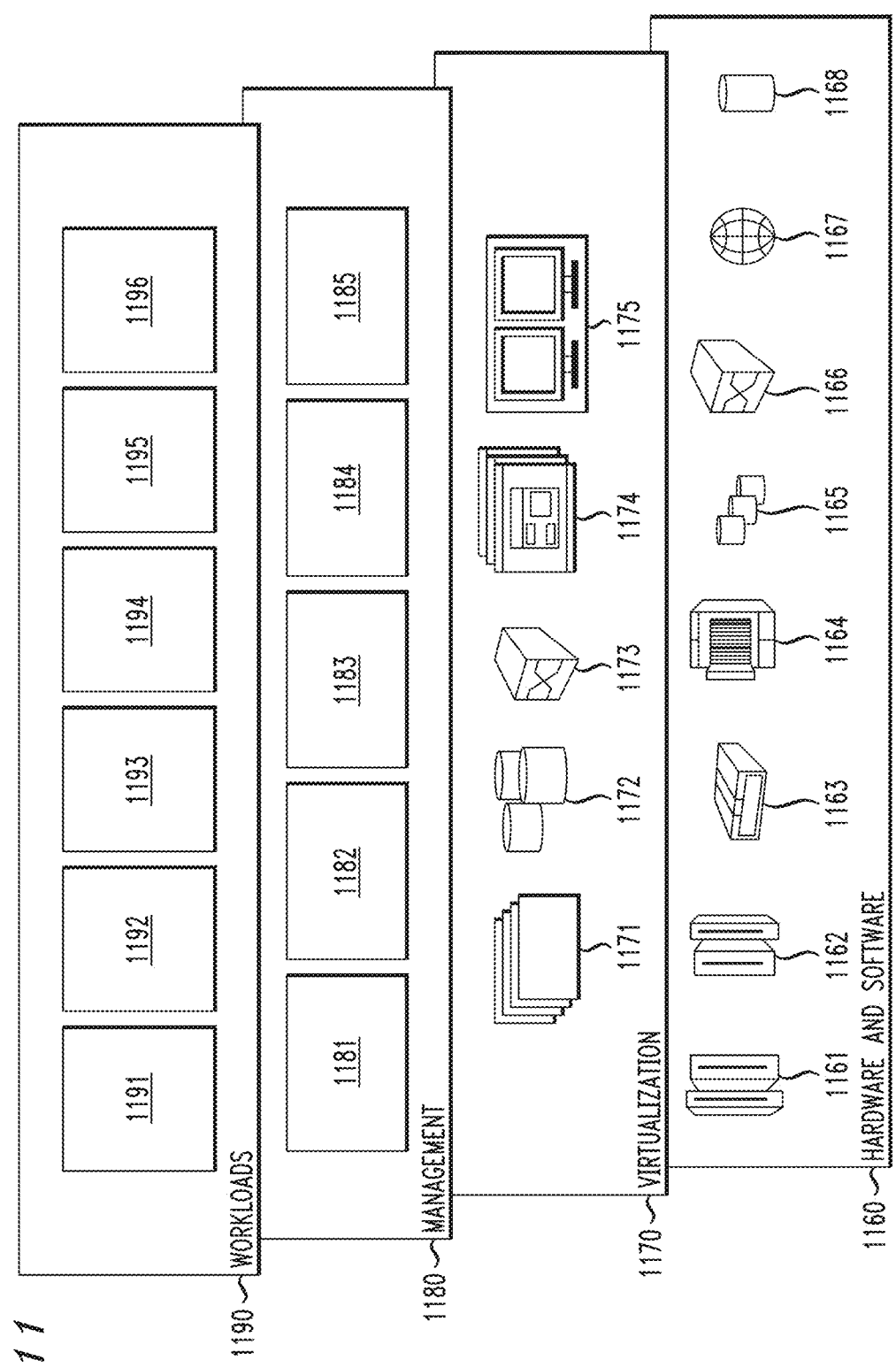
FIG. 11 depicts a diagram of abstraction model layers according to an illustrative embodiment.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture-based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175. In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and artificial intelligence algorithm processing 1196, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, a framework (e.g., a set of one or more framework configurations) that replaces the complex manual (e.g., custom-built) development of model restoration logic. As illustratively described herein, the framework is configured and instantiated with a set of failure detection components and associated model restoration pipelines. Once instantiated, the framework plugs into a given lifecycle using logs as inputs and delivers new model artifacts for a new model version into the existing lifecycle pipelines. In one or more illustrative embodiments, the framework is a cloud-based framework and platform for end-to-end development and lifecycle management of AI applications.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A neural network device, comprising:
   a first plurality of synapse network capacitors, wherein the synapse network capacitors of the first plurality of synapse network capacitors share a first output terminal;
   a second plurality of synapse network capacitors, wherein the synapse network capacitors of the second plurality of synapse network capacitors share a second output terminal; and
   a metal shielding disposed between the first output terminal and the second output terminal.

2. The neural network device of claim 1, wherein the metal shielding disposed between the first output terminal and the second output terminal is connected to a ground terminal.

3. The neural network device of claim 1, wherein the metal shielding is disposed between the first output terminal and the second output terminal such that the metal shielding capacitively decouples the first output terminal from the second output terminal.

4. The neural network device of claim 1, wherein each of the synapse network capacitors in the first plurality of synapse network capacitors comprises an input terminal independent from an input terminal of each of the other synapse network capacitors of the first plurality of synapse network capacitors.

5. The neural network device of claim 4, wherein each of the synapse network capacitors in the second plurality of synapse network capacitors comprises an input terminal independent from an input terminal of each of the other synapse network capacitors of the second plurality of synapse network capacitors.

6. The neural network device of claim 1, wherein the input terminal of each synapse network capacitor is addressable via a given word line of the neural network device and each of the first and second pluralities of synapse network capacitors is further addressable via a given bit line of the neural network device.

7. The neural network device of claim 1, wherein the neural network device is part of an artificial intelligence system.

8. An artificial intelligence system, comprising:
   at least one processing device comprising a neural network structure having multiple layers of neuron nodes operatively coupled by synapse elements, wherein the synapse elements are configured in at least two pluralities of synapse elements, and wherein the at least two pluralities of synapse elements comprise:
   a first plurality of synapse elements, wherein the synapse elements of the first plurality of synapse elements share a first output terminal;
   a second plurality of synapse elements, wherein the synapse elements of the second plurality of synapse elements share a second output terminal; and
   a metal shielding disposed between the first output terminal and the second output terminal.

9. The artificial intelligence system of claim 8, wherein the metal shielding disposed between the first output terminal and the second output terminal is connected to a ground terminal.

10. The artificial intelligence system of claim 8, wherein the metal shielding is disposed between the first output terminal and the second output terminal to decouple the first output terminal from the second output terminal.

11. The artificial intelligence system of claim 8, wherein each of the synapse elements in the first plurality of synapse elements comprises an input terminal independent from an input terminal of each of the other synapse elements of the first plurality of synapse elements.

12. The artificial intelligence system of claim 11, wherein each of the synapse elements in the second plurality of synapse elements comprises an input terminal independent from an input terminal of each of the other synapse elements of the second plurality of synapse elements.

13. The artificial intelligence system of claim 8, wherein the input terminal of each synapse element is addressable via a given word line of the at least one processing device and each of the first and second pluralities of synapse elements is further addressable via a given bit line of the at least one processing device.

* * * * *